United States Patent [19]

Eibert et al.

[11] Patent Number: 5,621,807
[45] Date of Patent: Apr. 15, 1997

[54] INTELLIGENT RANGE IMAGE CAMERA FOR OBJECT MEASUREMENT

[75] Inventors: Max Eibert, Friedrichshafen; Harald Hopfmüller, Markdorf; Rolf Katzenbeisser, Ravensburg; Christoph Schaefer, Friedrichshafen, all of Germany

[73] Assignee: Dornier GmbH, Germany

[21] Appl. No.: 322,343

[22] Filed: Oct. 13, 1994

Related U.S. Application Data

[63] Continuation-in-part of Ser. No. 263,336, Jun. 21, 1994, abandoned.

[30] Foreign Application Priority Data

Jun. 21, 1993 [DE] Germany ............... 43 20 485.6

[51] Int. Cl.[6] ................................................. G06K 9/00
[52] U.S. Cl. ........................... 382/103; 356/3.16; 364/460
[58] Field of Search ........................... 382/107, 106, 382/108; 342/64; 364/424.02; 395/125, 129

[56] References Cited

U.S. PATENT DOCUMENTS

| | | | |
|---|---|---|---|
| 4,653,109 | 3/1987 | Lemelson et al. | 382/107 |
| 4,674,869 | 6/1987 | Pryor et al. | 356/3.06 |
| 4,796,997 | 1/1989 | Svetkoff et al. | 356/376 |
| 4,971,445 | 11/1990 | Sato et al. | 356/376 |
| 4,988,189 | 1/1991 | Kroupa et al. | 356/4.03 |
| 5,005,147 | 4/1991 | Krishen et al. | 364/578 |
| 5,087,916 | 2/1992 | Metzdorff et al. | 342/64 |
| 5,109,425 | 4/1992 | Lawton | 382/107 |
| 5,170,352 | 12/1992 | McTamaney et al. | 364/424.02 |
| 5,243,666 | 9/1993 | Hasegawa et al. | 382/107 |
| 5,488,675 | 1/1996 | Hanna | 382/284 |
| 5,557,684 | 9/1996 | Wang et al. | 382/236 |

FOREIGN PATENT DOCUMENTS

| | | | |
|---|---|---|---|
| 2219905 | 12/1989 | United Kingdom | 382/103 |
| 2229027 | 9/1990 | United Kingdom | 382/103 |

*Primary Examiner*—Joseph Mancuso
*Assistant Examiner*—Jayanti K. Patel
*Attorney, Agent, or Firm*—Evenson, McKeown, Edwards & Lenahan P.L.L.C.

[57] ABSTRACT

A range imaging sensor for classifying and determining the position and orientation of remote objects combines a high resolution three-dimensional range imaging camera with a conventionally configured data processor. Three-dimensional object geometry sensed by the camera is compared with a plurality of three-dimensional models stored in a memory of the data processor. The spacial relationship between iteratively selected models and the sensed object is evaluated for varying positions and orientations of the model, and an optimum object classification and object position/orientation are detected and transmitted as an output signal.

17 Claims, 7 Drawing Sheets

5,621,807

INTELLIGENT RANGE IMAGE CAMERA FOR OBJECT MEASUREMENT

BACKGROUND AND SUMMARY OF THE INVENTION

This application is a continuation-in-part of U.S. patent application Ser. No. 08/263,336 filed Jun. 21, 1994 now abandoned. The invention relates to the measurement of objects by means of an intelligent range imaging camera which generates an image of an object in terms of the "range" or distance to points on its surface.

To understand the significance of the invention, a distinction must be made between "cooperative" and "noncooperative" scenes in the contactless, optical measurement of objects. For cooperative scenes (defined below), known image processing systems may be used, which determine the three-dimensional surface contour of an object from individual video images or from pairs of video images. To constitute a cooperative scene, however, certain conditions must be satisfied: the surface of the object may have to be prepared, the object may have to be illuminated in a certain way (with a pattern or the like), and background lighting may have to be adjusted. In cooperative scenes, the functions of object classification and position and attitude determination can be performed with prior art systems; however, reliability and accuracy of the results depend upon the scope and quality of scene preparation.

In noncooperative scenes, prior art image processing systems frequently fail. Thus, as an alternative, individual measurements are performed at selected points on the object, which can be done optically using triangulation methods. However, in order to identify the selected points, a human being must take part in the process, and this method is therefore usually not applicable for point-to-point surface measurement, nor is it employed for automatic object classification.

The object of the present invention is to provide an accurate and reliable system for zero-contact, fully automatic acquisition of rigid objects in a noncooperative natural environment. In particular, it is an object of the invention to provide such a system for object measurement, position and attitude determination, and object classification.

This goal is achieved by the intelligent range imaging camera according to the invention, which combines a high resolution three-dimensional imaging sensor with a standard data processor having a plurality of three-dimensional digital models of possible objects stored therein. Three-dimensional object geometry data acquired by the sensor are compared by the data processor with one or more of the three-dimensional geometric models in order to identify the object, as well as its position and spacial orientation or attitude. For this purpose, three essential processing steps are performed. First, an object classification hypothesis is generated. Second, the object model associated with this hypothesis is compared with the acquired image geometry to develop a coarse position/attitude hypothesis; and finally, the hypothesized object classification, position and attitude are tested against the image to develop the final, more precise determination of these parameters. This information can then be used to control a variety of robotic, materials handling and measurement devices.

The advantages of the invention lie primarily in its use to evaluate noncooperative scenes. The functions of zero-contact object measurement, position and attitude determination, as well as object classification can be performed fully automatically with the invention, which results in increased efficiency and fewer errors than with conventional methods. In addition, entire object surfaces can be measured instead of just a few selected points, resulting in maximum precision in determining the desired parameters. Finally, automatic object classification is important for applications involving "computer vision," such as described above.

Other objects, advantages and novel features of the present invention will become apparent from the following detailed description of the invention when considered in conjunction with the accompanying drawings.

DETAILED DESCRIPTION OF THE DRAWINGS

Figure 1:
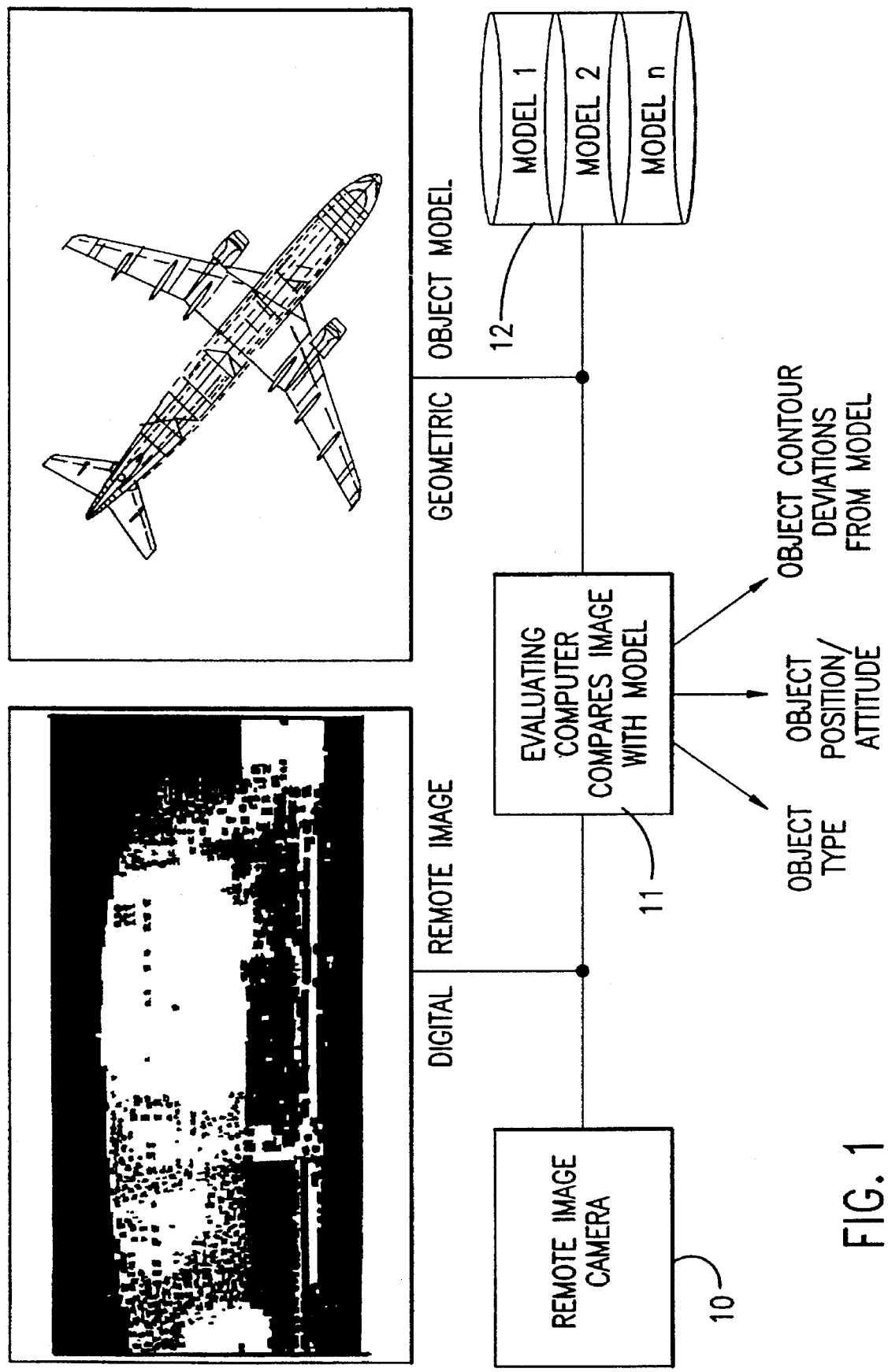
FIG. 1 is a schematic diagram which shows the basic structure and operation of the intelligent camera according to the invention.

Referring to FIG. 1, the intelligent camera for object measurement according to the invention consists of a range image sensor or camera 10, a specially programmed evaluating computer 11, and a memory 12 containing stored digitized surface contour data for a number of objects. Any of several known three-dimensional image sensors with high image resolution and absolute measuring ability can be used as the sensor 10 for the object measurement system. Such a sensor is commercially available, for example, from the Dornier Company; it is primarily an imaging laser radar sensor whose features, as described in German Patent DE 39 42 770 C2 of Jan. 16, 1992 (U.S. patent application Ser. No. 07/632,051 filed Dec. 21, 1990), are as follows:

Three-dimensional imaging;

Distance measurement principle is time-of-flight;

Distance resolution in the cm range;

Line scanner, for example in the form of a fiber-optic scanner, such as described in German Patent DE 39 42 771 C1 of Jul. 4, 1991 (U.S. patent application DOR/M747-S filed Dec. 21, 1990);

Column scan, performed by regulated mirror movement for example; and

Generation of range images.

For the application described, this instrument was improved as follows in order to obtain absolutely calibrated distance values and a higher image resolution.

Distance Calibration. An optical fiber built into the sensor is periodically introduced into the optical beam path, and a time-of-flight measurement through this fiber—whose length is known—is conducted with the sensor electronics. This measurement result is used to calibrate the remaining measurement values. Systemic distance measurement errors, caused for example by temperature sensitivity of electronic components, are thus recognized and compensated. In addition, a continuous self test of the laser radar (range imaging camera) is performed.

Image Resolution. In static scenes, the accuracy of the distance measurements can be increased by averaging over several sensor images. The range image camera is designed so that when successive pictures are taken of the same scene, the scanning geometry can be varied slightly. The resulting sensor images are therefore slightly displaced angularly with respect to one another so that after several images have been taken, a continuous image of the scene is obtained. The respective displacement is measured accurately by an angle encoder, for example. These measures, used in conjunction with a suitable evaluation, make it possible not only to increase the accuracy of the distance measurement by taking several images, but to improve image resolution as well.

Processor Hardware. The evaluating computer 11 (FIG. 1) is conventionally configured (in terms of hardware) as a single or multiple processor system with the following peripherals:

Disk drive station for entering programs and data;

Hard disk for storing programs and data;

Interface to sensor for remote image transfer; and

Possibly an additional application-specific interface for transfer of output data.

The required size of storage medium (12) is determined by the size and number of objects to be measured.

Processor Software. The software used in the evaluating computer consists of the following:

(1) Operating system;

(2) Driver routine for the interface to the range image sensor;

(3) Evaluating program (discussed below) with the following functions: object measurement, position and attitude determination, object classification;

(4) A driver routine for the output interface (optional).

Evaluating Program. The main function of the evaluating program involves comparing the three-dimensional object geometry acquired by the sensor with one or more three-dimensional geometric models stored in the computer (CATIA or some other CAD data format representing three-dimensional geometric models).

Figure 2:
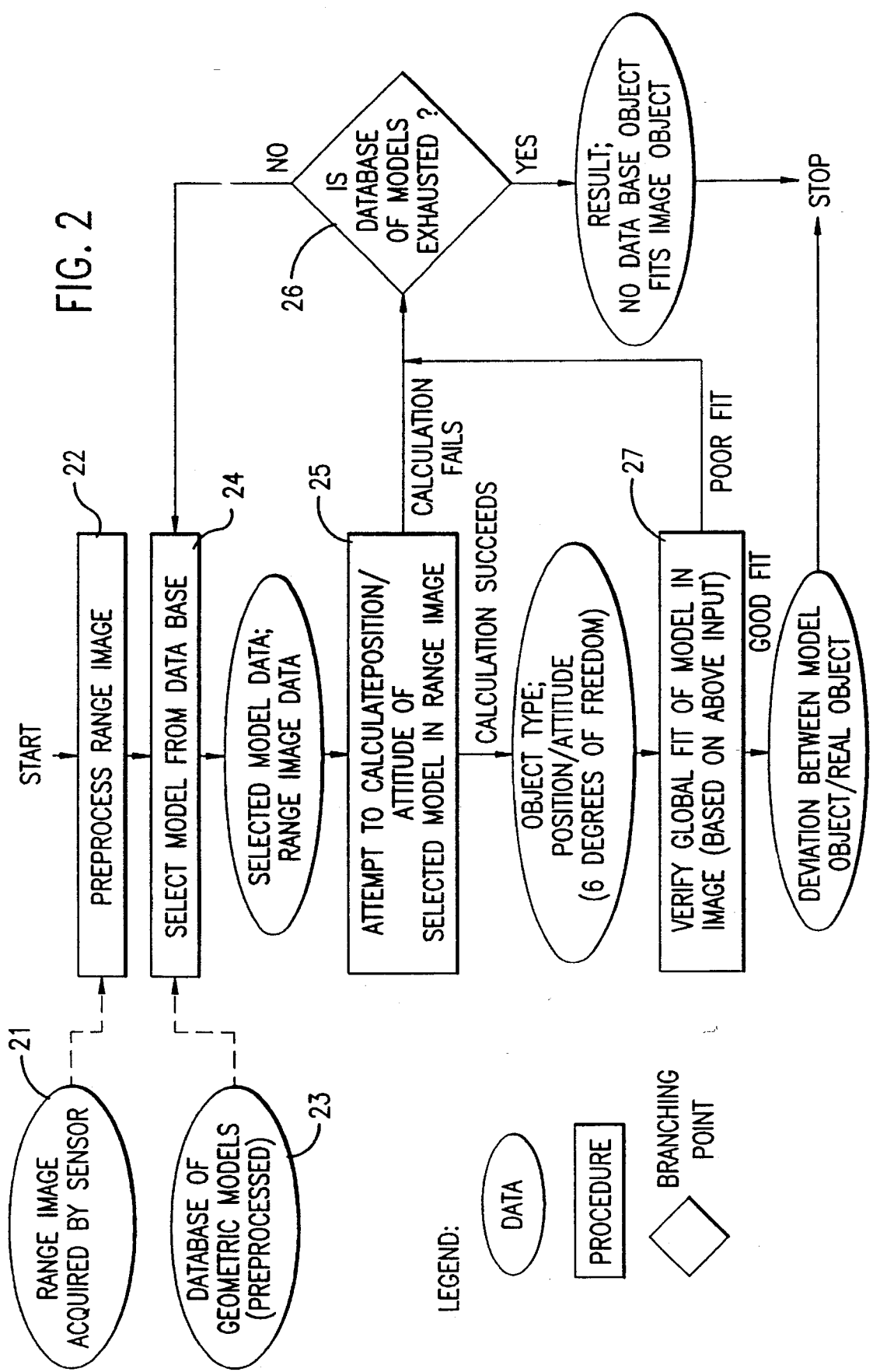
FIG. 2 is a flow chart for an evaluation program for object classification and position/attitude determination according to the invention.

The process followed by the evaluating program is shown schematically in FIG. 2. A range image 21 is recorded and preprocessed. Preprocessing 22 consists of conventional tasks such as segmentation and transformation. The purpose of segmentation is to distinguish the image pixels pertaining to the object under consideration from pixels that belong to a floor or pavement, e.g., or to background objects. Transformation is addressed below. After step 22, the program generates a hypothesis 24 regarding the type of object, by selecting a geometric model from those 23 stored in memory 12 (FIG. 1), either randomly or according to a predetermined sequence.

In the subsequent position and attitude determination module 25, the geometric model corresponding to the hypothesis is matched as well as possible with the range image data by a calculation, which is described in greater detail hereinafter. If the method fails (that is, a sufficiently close match cannot be achieved) the current object type hypothesis is rejected and another hypothesis is generated. Otherwise the calculated object position and attitude based on the current object type hypothesis permits the calculation 27 of a "reference range image." The comparison of this reference range image with the "actual range image" results in one of the following three alternatives:

(1) All measurement points that lie on the object correspond in the reference image and the actual image within the limits of measurement accuracy (exit "good fit" from 27).

(2) A large number of measurement points that lie on the object correspond in the reference image and the actual image; for a minor number, the deviation exceeds the measurement error (exit "good fit" from 27).

(3) For a large number of measurement points, no match can be found between the reference image and the actual image (exit "poor fit" from 27).

The following conclusions and actions follow from these three alternatives.

(1) The current object type hypothesis is correct; the currently calculated position and attitude of the object are correct; the measured object corresponds to the geometric model within the sensor field-of-view and within the limits of sensor measurement accuracy. The program is terminated.

(2) The currently calculated position and attitude of the object are correct; the current object type hypothesis is basically correct, but there are some differences between the object model and the real object. The calculation can either be repeated with a slightly different geometric model (if available) and the corresponding comparison between referenced and actual images can be performed again; or the program can be terminated and the location and the degree of the deviations are output.

(3) The current object type hypothesis is incorrect; the calculation must be repeated with a new object type hypothesis.

The program can be simplified if additional prior knowledge is available. For example, if the object type is known in advance, its variation is not required and the program merely delivers the object position and attitude as well as differences between the real object and the model.

Figure 3:
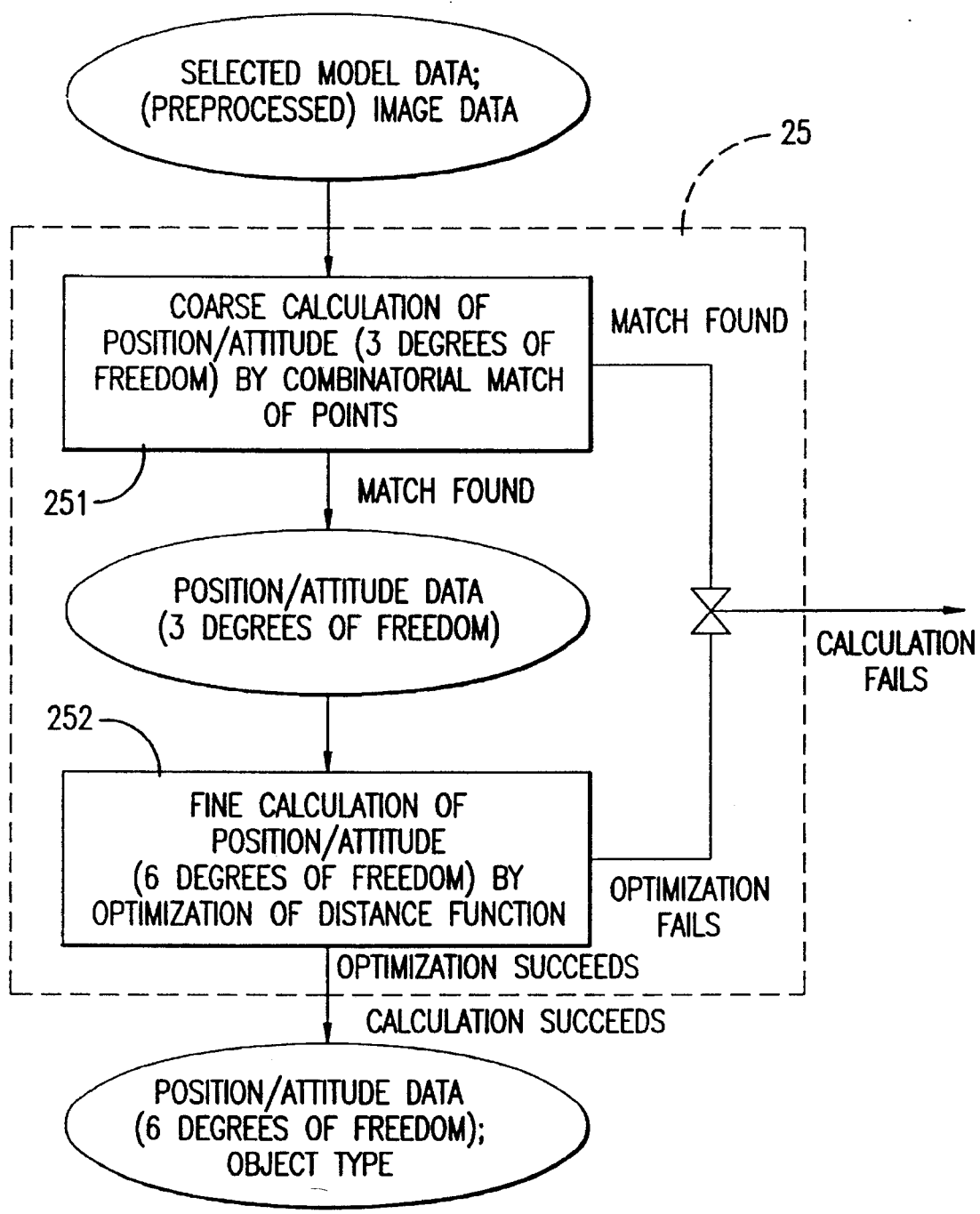
FIGS. 3–6 are flow charts for operations occurring at various levels of the evaluation program.

Position/Attitude Determination. The module for position and attitude determination 25 (FIG. 3) is of primary significance. It must function first of all without a starting value and must be fast since it is operated in a closed loop, with variable object types. Moreover, it must run completely automatically and utilize data redundancy at the input (range image) relative to the output (six coordinates—three each for position and attitude) for optimum accuracy. It is described in more detail below.

The individual distance values in a range image can be transformed into three-dimensional vectors using simple, well known transformation rules. These vectors determine the locations of object surface points in the coordinate system of the sensor. In preparation for position/attitude calculation 25, such a three-dimensional reconstruction of the surface is performed within preprocessing module 22. Because a range image is used, such reconstruction is independent of external illumination conditions and object surface reflectivities.

To evaluate a position and attitude hypothesis for any specific object type, the geometric model of the object is merely to be inserted accordingly into the three-dimensional reconstruction of the scene; then a check is made to determine whether a sufficient number of scene points actually lies on the model surface of the object. For this purpose, with the aid of the so-called "distance function," which is well known to those skilled in the art, the quality of any position and attitude hypothesis can be quantified. That is, for each scene point the squared spatial distance from the corresponding point on the inserted model surface is calculated as a function of the position and attitude coordinates in question; then averaging is performed over the totality of these squared distances (excluding distances that are "too large").

Mathematically speaking, position and attitude calculation in the present evaluation method consists of a global minimization of the distance function—a so-called extreme value problem and least-squares fit. (In the ideal case of zero measurement error, the minimum or extreme value assumed at the desired solution point would, of course, be zero.)

Proximite to the solution point, the distance function can be approximated as a second order Taylor series expansion of the position and attitude error. To improve upon an estimated value for the solution (a so-called starting value), both direct and iterative standard methods are available. The direct method is used in the processing (fine positioning 252 (FIG. 3)) according to the invention, as described hereinafter.

"Coarse positioning" unit 251 (FIG. 3) which precedes fine positioning unit 252 generates a position and attitude hypothesis such as is required as a starting value for the fine positioning unit 252. For the purpose of coarse positioning, however, no assumptions can be made regarding the shape of the distance function which could lead to a generally valid solution method, as in fine positioning. Since the treatment of such arbitrary functions is computationally costly, coarse positioning the coarse position/attitude unit 251 is limited to three variables, which in many applications (for example aircraft on a level taxiway where vertical position and the pitch and roll angles of the plane are roughly known) results in sufficient accuracy for the starting value for fine positioning. That is, in contrast to fine positioning, the coarse positioning method solves the extreme value problem in terms of only three variables, with limited accuracy, but requires no starting value.

Together, these two methods solve the above-mentioned extreme value problem (minimization of the distance function), without a starting estimated value for the position and attitude of the object, with considerable accuracy and in all six degrees of freedom (three-dimensional position, plus pitch, roll and yaw).

Figure 4:
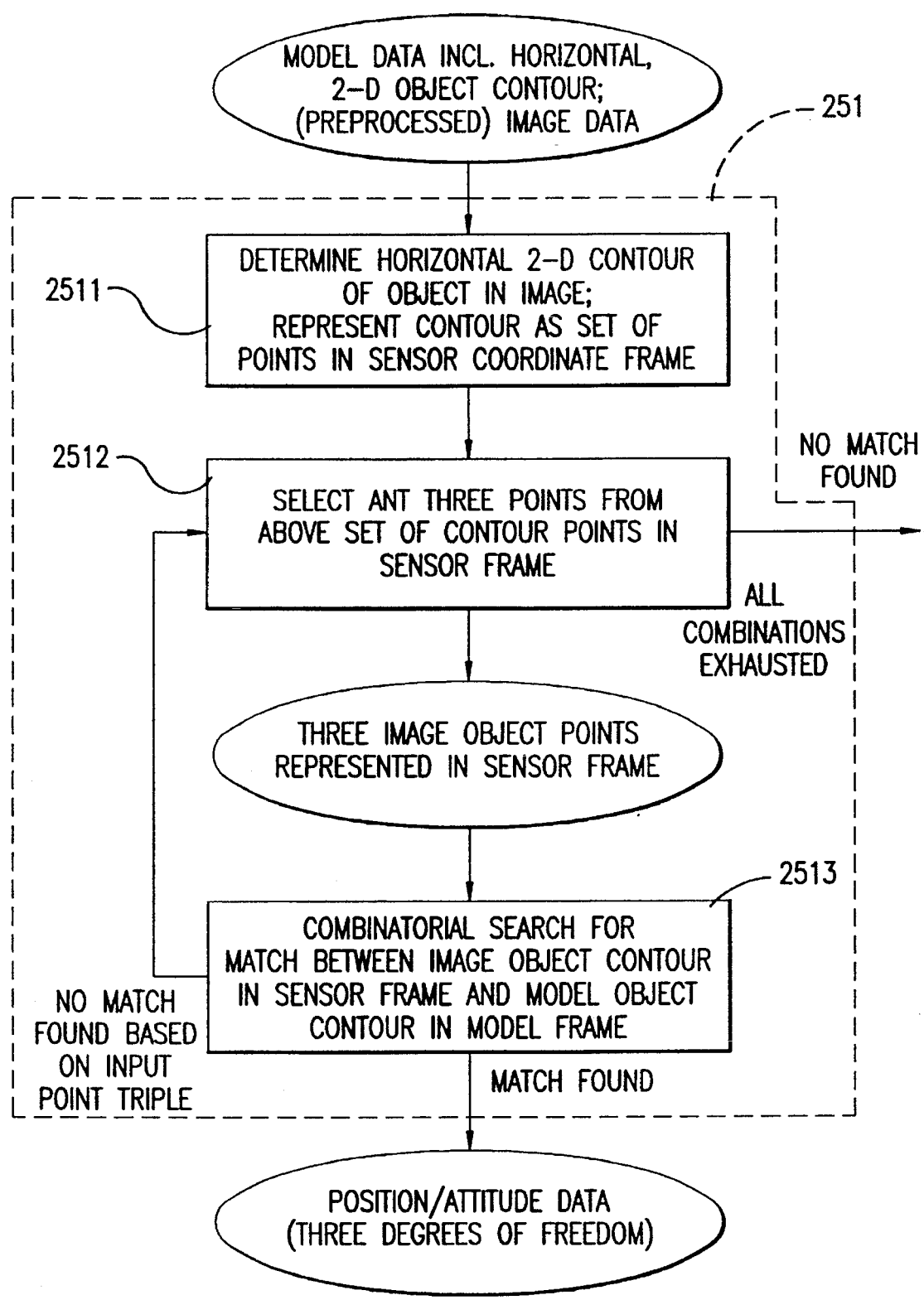

Course Position/Attitude Determination. The course positioning/attitude unit (FIG. 4) is based on matching the horizontal, two-dimensional contour of the object in the image—e.g., an aircraft on a taxiway (see FIG. 1)—with the corresponding model contour. Of course, while the latter is closed, the former is acquired only in part, since the sensor cannot look behind the object. The contour segment of the image object is determined as a discrete set of points represented in the sensor coordinate system within module 2511. This set of points is to be matched with the closed contour of the model object; i.e., the latter is translated and rotated until the former point set becomes a subset of the latter.

The resulting large number of combinations is performed very efficiently in the loop consisting of modules 2512 and 2513. The efficiency is achieved by not actually applying every possible translation and rotation to the image point set and comparing with the model contour. Instead, based on an arbitrary subset of three points of the image contour selected in 2512, in module 2513 only translations and rotations of the model contour are considered that are consistent with the input point triplet. Here consistency means that there exists a subset of three points from the model contour whose pairwise (horizontal) distances are equal to those of the input tripet. If in module 2513 no match between the image and model contours is found, module 2513 is based on a new triplet of image contour points and repeated.

Figure 5:
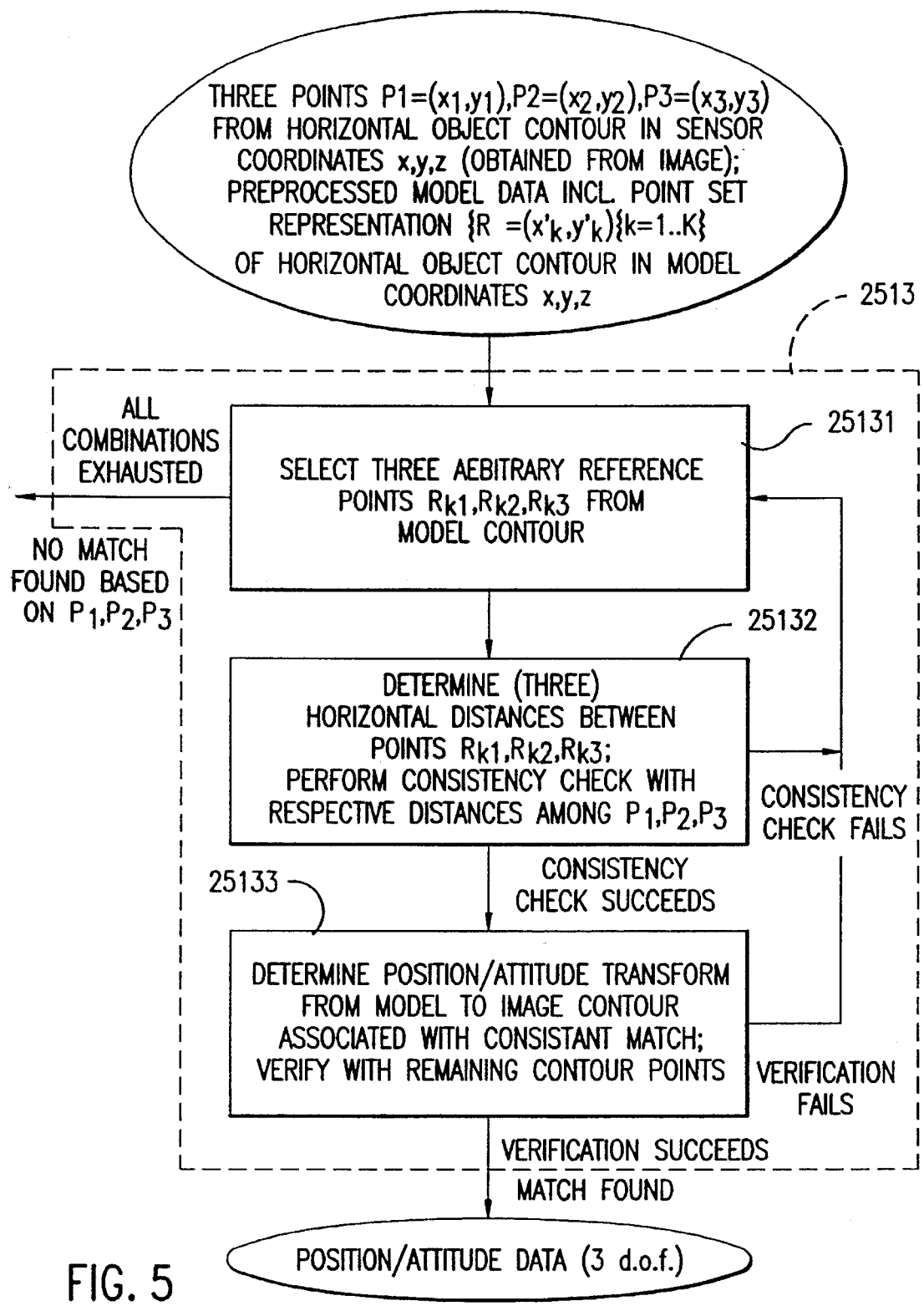

For an efficient execution of module 2513 (FIG. 5), the model object contour is digitized off-line and stored in memory 12 (FIG. 1) as a set of points in the reference frame. Together with the (dynamic) point triplet this (static) data set serves as input to module 2513. In principle, 2513 functions as follows: a loop is performed for every set of three points 25131 in the model contour point set; a consistency check 25132 is performed between the two triple point sets; only if consistency occurs, the resulting translation and rotation is explicitly determined in module 25133, and a complete match involving all image contour points based on this translation and rotation is executed. When this match succeeds, the desired three position and attitude variables have been determined. It should be noted that the functional loop occurring in unit 2513 (FIG. 5) can be implemented extremely efficiently using a look-up table of distances and associated points occurring in the model contour. The data constituting this look-up table are static and are prepared off-line to the actual evaluating program. Given the three pairwise distances among points $P_1, P_2, P_3$, the look-up table exhibits all consistent combinations of points $R_{k1}, R_{k2}, R_{k3}$, eliminating the need of actually looping through every possible triple $R_{k1}, R_{k2}, R_{k3}$ in modules 25131 and 25132.

Figure 6:
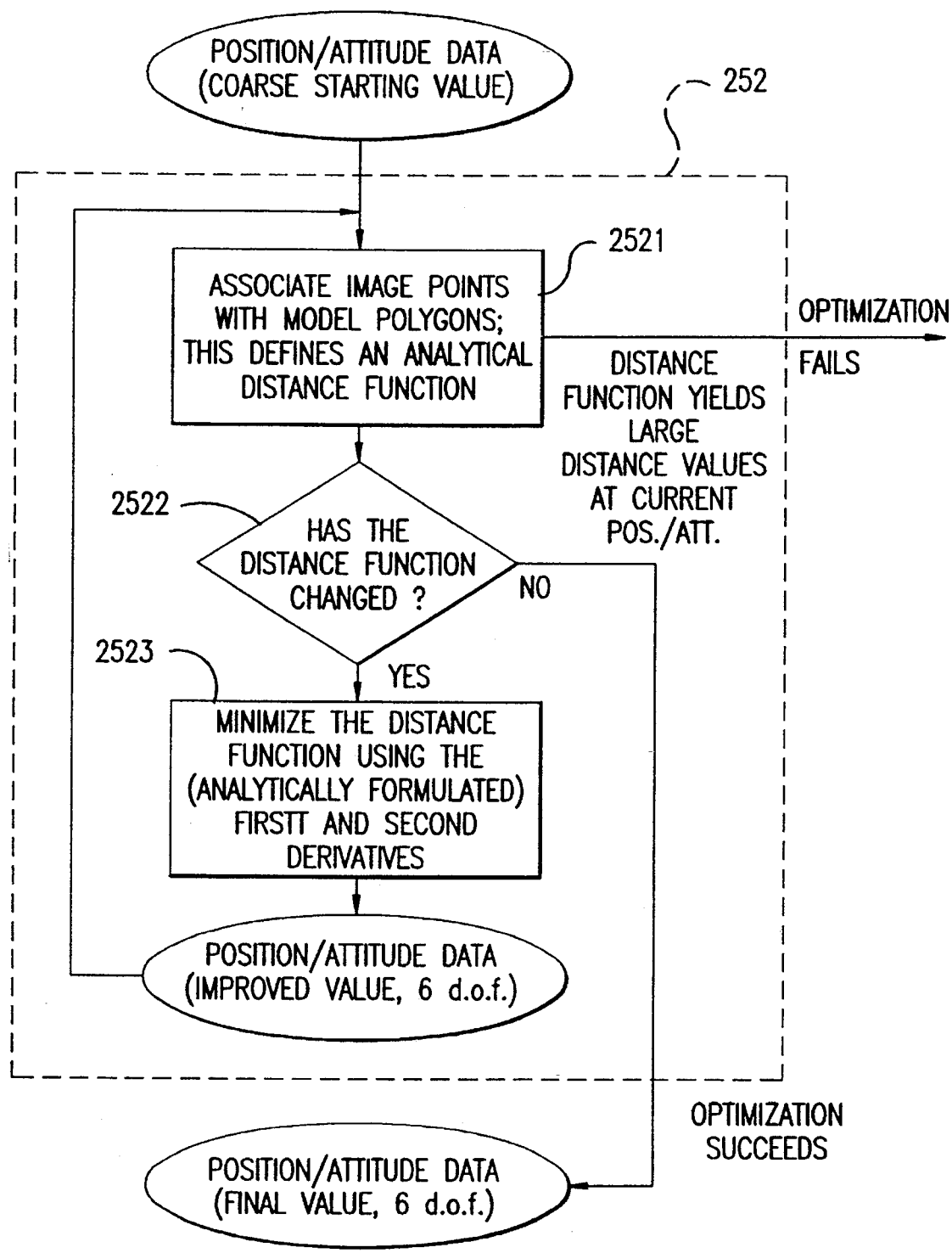

Fine Position/Attitude Determination. The fine attitude/position module 252 (FIG. 6) receives the output position/attitude data generated by the coarse position/attitude module 251 (FIG. 3), and uses it as a starting value to generate a highly accurate evaluation of all six position and attitude coordinates of the object, by minimizing the average squared distance of image points from the model surface. For this purpose, the model surface approximating the object surface consists of a network of polygons which are flat and which meet at their respective sides. For a given position/attitude hypothesis, a unique, closest surface polygon can be associated with each image point. With this association between image points and surface polygons held fixed, the corresponding distance function (i.e., a real function of the six variables of position and attitude whose value is the average squared distance between image points and associated polygons) can be formulated analytically 2521. Moreover, this is true also for its derivatives, so the distance function can be minimized efficiently using standard mathematical techniques 2523. After each minimization of the current distance function (corresponding to a fixed set of image points and associated polygons), the latter association is recalculated (based on the improved position/attitude data) and the new, improved distance function is again minimized. This iterative procedure is stopped 2522 when the distance function remains unchanged despite the latest update of the position and attitude variables.

Processing is performed in parallel on a multiprocessor system, so as to reduce computational processing time and increase the speed of the system. Evaluation is performed on the basis of an average of plural range images in order to achieve high accuracy. Results of the processing may be displayed in an output display unit 30, or may be used to drive any controlled system 31, which is adapted for digital control as depicted in FIG. 7.

Results. The position/attitude determination system according to the invention has been successfully tested under practical conditions, and has generated highly accurate position and attitude information for a large passenger aircraft not specially marked. In this case, the intelligent range image camera was part of a washing robot 29 (FIG. 1). The test was conducted in the open under different weather conditions at different times of day (including night) and with the aircraft skin both dry and wet. The measurement time was approximately 1.5 minutes, and the subsequent online evaluation of the position and attitude calculation required about two minutes.

Figure 7:
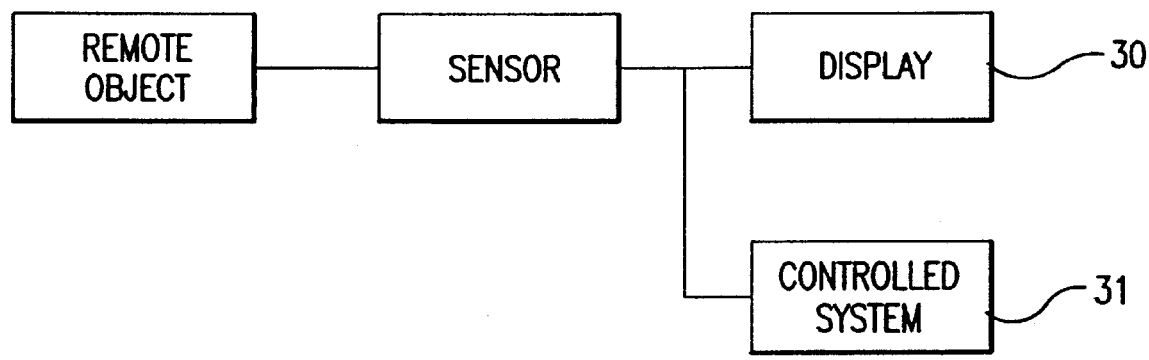
FIG. 7 is a schematic diagram which shows the use of the intelligent camera according to the invention to control operation of a controlled system.

Other present, intended and possible applications of the invention, as shown in FIG. 7, include the following:

Vehicle guidance in positioning of a washing robot for aircraft;

Measurement process for calculating the washing trajectories of the washing robot;

Work area monitoring during the washing process for washing robots;

Same for a deicing robot for aircraft;

Position, attitude, and type recognition for automatic piloting of aircraft when docking;

Generating CAD geometric data model for aircraft, etc.;

Testing the deviations of actual aircraft from their model data;

Position and attitude determination for automatic container loading;

Object and scene measurement for three-dimensional data acquisition and model generation; and General object measurement.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for detecting position and attitude of remotely sensed objects, comprising:

a sensor for acquiring three-dimensional surface contour image data of a remote object;

a memory having stored therein three-dimensional surface contour model data for a geometric model of at least one object;

object type hypothesis means for iteratively selecting one of said at least one geometric model and for reading said three-dimensional surface contour model data for said selected geometric model from said memory; and a data processor for comparing said surface contour model data for said selected geometric model with said image data of said remote object and for generating output signals representative of an object classification, position and attitude for said remote object;

wherein said data processor includes a coarse position/attitude unit and a fine position/attitude unit, said coarse position/attitude unit comprising:

means for determining a two-dimensional partial horizontal contour of said remote object, as a function of said three-dimensional surface contour image data acquired by said sensor;

means for determining a two-dimensional complete horizontal contour of said geometric model, as a function of said surface contour model data stored in said memory;

means for determining a likelihood of a match of said partial horizontal contour and said complete horizontal contour independent of horizontal position and vertical rotation of said remote object, by comparing distances of three points on said partial horizontal contour with distances of three corresponding points on said complete horizontal contour;

means for iteratively selecting horizontal positions and vertical rotations of said remote object for maximization of said likelihood of a match;

means for identifying a horizontal position and vertical rotation for which said likelihood of a match is large and yields a true match of said partial and said complete horizontal contours; and means for selecting a different geometric model if no spacial position and rotation yields a true match of said partial and said complete horizontal contours.

2. Apparatus according to claim 1 wherein said fine position/attitude unit comprises means for determining six variables of position and attitude of a specified object in the sensed image by minimizing an average distance between image points and the selected model surface, based on said horizontal position and vertical rotation.

3. Apparatus according to claim 2 wherein said hypothesized position/attitude determination comprises values for three-dimensional position of said remote object and values for its rotational orientation about three orthogonal axes, and wherein said output signal comprises an object classification based on said selected geometric model.

4. Apparatus according to claim 1 further comprising data transforming means for converting said surface contour image data acquired by said sensor into three-dimensional vector values for processing by said data processor.

5. Apparatus according to claim 4 wherein said fine position/attitude unit comprises means for comparing said data of said selected geometric model oriented in said hypothesized position/attitude with said three-dimensional surface contour image data acquired by said sensor, and for detecting a predetermined relationship between said data of said selected geometric model and said image data acquired by said sensor; and generating said output signal based on said hypothesized position/attitude in response to detection of said predetermined relationship.

6. Apparatus according to claim 1 further comprising:

an optical fiber of known length and intermittently coupled into an optical path of sensor; and means for causing said sensor to measure time required for signals to propagate through said opticalfiber for calibrating said sensor.

7. Method of detecting position and attitude of remote object comprising the steps of:

scanning said remote object to acquire three-dimensional surface contour image data thereof;

selecting a geometric model from among a plurality of models of objects, and reading three-dimensional surface contour model data for said selected geometric model from a memory wherein said data are stored;

comparing said surface contour model data for said selected geometric model with said surface contour image data acquired in said scanning step;

detecting a predetermined relationship between said data for said selected geometric model and said data acquired by said scanner; and generating output signals in response to detection of said predetermined relationship, said output signals being representative of an object classification and position and attitude of said remote object;

wherein said comparing step comprises:

determining a horizontal position and vertical rotation of a horizontal contour of said selected model such that horizontal contour points of the acquired remote object fit into the horizontal contour of said selected model as a subset;

determining a combined displacement of all points on said selected geometric model from points on the acquired three-dimensional surface contour of said remote object, for respective position and attitude hypotheses of said geometric model; and determining a position and attitude of said geometric model for which said combined displacement is minimum; and wherein said step of determining a position and attitude further comprises:

comparing said data of said selected geometric model oriented in said hypothesized position/attitude with said three-dimensional surface contour image data acquired from said scanning step to detect a predetermined relationship therebetween; and generating said output signal based on said hypothesized position/attitude in response to detection of said predetermined relationship.

8. Apparatus according to claim 7 wherein said fine position/attitude unit comprises:

means for comparing said data of said selected geometric model oriented in said hypothesized position/attitude with said three-dimensional surface contour image data acquired by said sensor, and for detecting a predetermined relationship between said data of said selected geometric model and said image data acquired by said sensor; and means for generating said output signal based on said hypothesized position/attitude in response to detection of said predetermined relationship.

9. Apparatus according to claim 7 wherein said hypothesized position/attitude determination comprises values for two-dimensional horizontal position of said remote object and its rotational orientation about a vertical axis, and wherein said output signal comprises an object classification based on said selected geometric model, values for three-dimensional position of said remote object and values for its rotational orientation about three orthogonal axes.

10. Apparatus according to claim 9 wherein said hypothesized position/attitude determination comprises values for two-dimensional horizontal position of said remote object and its rotational orientation about a vertical axis, and wherein said output signal comprises an object classification based on said selected geometric model, values for three-dimensional position of said remote object and values for its rotational orientation about three orthogonal axes.

11. Apparatus according to claim 7 further comprising data transforming means for converting said surface contour image data acquired by said sensor into three-dimensional vector values for processing by said data processor.

12. A machine vision system comprising:

a sensor for acquiring three-dimensional surface contour image data of a remote object;

a memory having stored therein three-dimensional surface contour model data for a geometric model of at least one object;

object type hypothesis means for iteratively selecting one of said at least one geometric model and for reading said three-dimensional surface contour model data for said selected geometric model from said memory;

a data processor for comparing said surface contour model data for said selected geometric model with said image data of said remote object and for generating output signals representative of an object classification and position and attitude for said remote object;

an interface unit for generating a control signal in response to said output signals; and a controlled system actuated in response to said control signal;

wherein said data processor includes a coarse position/attitude unit and a fine position/attitude unit, said coarse position/attitude unit comprising:

means for determining a two-dimensional partial horizontal contour of said remote object, as a function of said three-dimensional surface contour image data acquired by said sensor;

means for determining a two-dimensional complete horizontal contour of said geometric model, as a function of said surface contour model data stored in said memory;

means for determining a likelihood of a match of said partial horizontal contour and said complete horizontal contour as a function of horizontal position and vertical rotation of said remote object, by comparing distances of three points on said partial horizontal contour with distances of three corresponding points on said complete horizontal contour;

means for iteratively selecting horizontal positions and vertical rotations of said remote object for maximization of said likelihood of a match;

means for identifying a horizontal position and vertical rotation for which said likelihood of a match is large and yields a true match of said partial and complete horizontal contours; and means for selecting a different geometric model if no spacial position and rotate on yields a match of said partial and complete horizontal contours.

13. Apparatus according to claim 12 wherein said fine position/attitude unit comprises means for determining six variables of position and attitude of a specified object in the sensed image by minimizing an average distance between image points and the selected model surface based on said horizontal position and vertical rotation.

14. Apparatus according to claim 13 wherein said hypothesized position/attitude determination comprises values for three-dimensional position of said remote object and values for its rotational orientation about three orthogonal axes, and wherein said output signal comprises an object classification based on said selected geometric model.

15. Apparatus for detecting position and attitude of remotely sensed objects, comprising:

a sensor for acquiring three-dimensional surface contour image data of a remote object;

a memory having stored therein three-dimensional surface contour data for a geometric model of at least one object;

object type hypothesis means for iteratively selecting one of said at least one geometric model and for reading said three-dimensional surface contour data for said selected geometric model from said memory; and a data processor for comparing said surface contour data for said selected geometric model with said image data of said remote object and for generating output signals representative of an object classification, position and attitude for said remote object; wherein:

said data processor comprises a coarse position/attitude unit and a fine position/attitude unit, said coarse position/attitude unit comprising:

means for determining an orientation of said selected geometric model for which a displacement of all points on said selected geometric model from points on sensed surface contour of said image is minimized;

means for comparing said minimized difference with a predetermined limit value;

means for outputting a hypothesized position/attitude determination which corresponds to said orientation for which said displacement of all points is minimized, if said minimized difference is less than said predetermined limit value; and means for actuating said object type hypothesis means to select a different one of said geometric models if said minimized difference is greater than said predetermined limit.

16. Method of detecting position and attitude of remote object comprising the steps of:

scanning said remote object to acquire three-dimensional surface contour image data thereof;

selecting a geometric model from among a plurality of models of objects, and reading three-dimensional surface contour data for said selected geometric model from a memory wherein said data are stored;

comparing said surface contour data for said selected geometric model with said surface contour image data acquired in said scanning step;

detecting a predetermined relationship between said data for said selected geometric model and said data acquired by said scanner; and generating output signals in response to detection of said predetermined relationship, said output signals being representative of an object classification and position and attitude of said remote object; wherein said comparing step comprises determining a combined displacement of all points on said selected geometric model from points on the acquired three-dimensional surface contour of said remote object, for at least one position and orientation of said geometric model;

determining a position and orientation of said geometric model for which said combined displacement is minimum;

comparing said minimum combined displacement with a predetermined limit value; and generating a hypothesized position/attitude determination which corresponds to said position and orientation having a minimum combined displacement when said minimum is less than said predetermined limit value; and wherein said comparing step further comprises comparing said data of said selected geometric model oriented in said hypothesized position/attitude with said three-dimensional surface contour image data acquired from said scanning step to detect a predetermined relationship therebetween; and generating said output signal based on said hypothesized position/attitude in response to detection of said predetermined relationship.

17. A machine vision system comprising:

a sensor for acquiring three-dimensional surface contour image data of a remote object;

a memory having stored therein three-dimensional surface contour data for a geometric model of at least one object;

object type hypothesis means for iteratively selecting one of said at least one geometric model and for reading said three-dimensional surface contour data for said selected geometric model from said memory;

a data processor for comparing said surface contour data for said selected geometric model with said image data of said remote object and for generating output signals representative of an object classification and position and attitude for said remote object;

an interface unit for generating a control signal in response to said output signals; and a controlled system actuated in response to said control signals; wherein:

said data processor comprises a coarse position/attitude unit and a fine position/attitude unit, said coarse position/attitude unit comprising:

means for determining an orientation of said selected geometric model for which a displacement of all points on said selected geometric model from points on sensed surface contour of said image is minimized;

means for comparing said minimized difference with a predetermined limit value;

means for outputting a hypothesized position/attitude determination which corresponds to said orientation for which said displacement of all points is minimized, if said minimized difference is less than said predetermined limit value; and means for actuating said object type hypothesis means to select a different one of said geometric models if said minimized difference is greater than said predetermined limit.

* * * * *